(12) United States Patent
Leeper et al.

(10) Patent No.: US 7,203,500 B2
(45) Date of Patent: Apr. 10, 2007

(54) APPARATUS AND ASSOCIATED METHODS FOR PRECISION RANGING MEASUREMENTS IN A WIRELESS COMMUNICATION ENVIRONMENT

(75) Inventors: David G. Leeper, Scottsdale, AZ (US); David G. England, Chandler, AZ (US); Jeffrey D. Hoffman, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 459 days.

(21) Appl. No.: 10/633,269

(22) Filed: Aug. 1, 2003

(65) Prior Publication Data

US 2005/0026563 A1 Feb. 3, 2005

(51) Int. Cl.
*H04Q 7/20* (2006.01)
(52) U.S. Cl. .................. 455/456.1; 455/41.2; 342/458
(58) Field of Classification Search ............ 455/456.1, 455/456.5, 456.6, 41.2; 342/357.08, 357.09, 342/357.1, 458, 463
See application file for complete search history.

(56) References Cited

U.S. PATENT DOCUMENTS 3,919,708 A 11/1975 Pudsey 6,011,974 A 1/2000 Cedervall et al.
2002/0118723 A1 8/2002 McCrady et al.

OTHER PUBLICATIONS

Xinrong Li et al: Indoor Geolocation Using OFDM Signals in Hiperlan/2 Wireless LAN's IEEE vol. 2, Sep. 18, 2000.
Porcino D et al: "Ultra-Wideband Radio Technology: Potential and Challenges Ahead" IEEE Communication S Magazine, IEEE Service Center, vol. 41 No. 7 Jul. 2003.
Adams J C et al: "Ultra Wideband for Navigation and Communications" IEEE vol. 2, Mar. 20, 2001.
PCT Search Report.

*Primary Examiner*—Lee Nguyen
(74) *Attorney, Agent, or Firm*—Michael A. Proksch (57) ABSTRACT

An apparatus and associated methods to provide precision ranging measurements in an ultrawideband (UWB) wireless communication system are generally described. In this regard, according to one example embodiment, an innovative ranging agent is introduced that effectively computes one or more of the time of signal propagation, the difference in local clocks and frequency offsets to calculate an increasingly accurate estimate of the proximal distance between two or more devices in UWB communication.x.

17 Claims, 4 Drawing Sheets

APPARATUS AND ASSOCIATED METHODS FOR PRECISION RANGING MEASUREMENTS IN A WIRELESS COMMUNICATION ENVIRONMENT

TECHNICAL FIELD

Embodiments of the present invention are generally directed to wireless communication technology and, more particularly, to an apparatus and associated methods for precision ranging measurements in a wireless communication environment.

BACKGROUND

Ultrawideband (UWB) wireless communication, in its most basic form, has been around since the beginning of wireless communication. According to one commonly held definition, a UWB signal is any signal wherein the bandwidth divided by the center frequency is roughly 0.25, or more. Recently (Feb. 14, 2002), the United States Federal Communication Commission (FCC) approved the use of a pulsed-RF UWB technology for unlicensed operation. UWB offers the potential to communicate at very high data rates (hundreds of megabits per second) with very low radiated power (200 microwatts or less) over short distances (10 meters or less). To date, this potential is yet to be realized, as there is not yet a commercially available UWB solution for this unlicensed application.

The Institute of Electrical and Electronic Engineers (IEEE) has established a standards task group, i.e., IEEE 802.15.3 TG3a, to study proposals for a standardized UWB wireless physical layer (PHY) representing the channel characteristics above. In addition to the promise of high-speed communications, another goal of the standard is to enable ranging measurements between UWB-equipped devices. While no specific accuracy/precision requirement has been set by TG3a, it has been generally assumed that with communications links of 1–10meters, a measurement accuracy/precision of 1 meter or better will be required.

Just such a solution is offered in the detailed description, below.

BRIEF DESCRIPTION OF THE DRAWINGS

Embodiments of the present invention are illustrated by way of example, and not by way of limitation, in the figures of the accompanying drawings in which like reference numerals refer to similar elements and in which.

DETAILED DESCRIPTION

Embodiments of an apparatus and associated methods for precision ranging measurements in a wireless communication environment are generally introduced herein. For ease of description, and not limitation, the broader teachings of the claimed invention will be developed in accordance with an implementation in an ultrawideband (UWB) wireless communication environment. In this regard, according to but one example embodiment of the teachings of the present invention, an innovative ranging agent is introduced which, in cooperation with a wireless communication transceiver (e.g., an ultrawideband transceiver), exchanges messages with one or more remote (target) receiver(s), recording local strobe times of transmission and reception of the exchanged messages. After (or, during) the exchange of multiple such messages, the devices exchange the locally recorded strobe times, from which the ranging agent in the device(s) may calculate one or more of a signal propagation time (or, delay), timing offset, frequency offset and proximal distance (or, range) between the devices.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Example Network Environment

Figure 1:
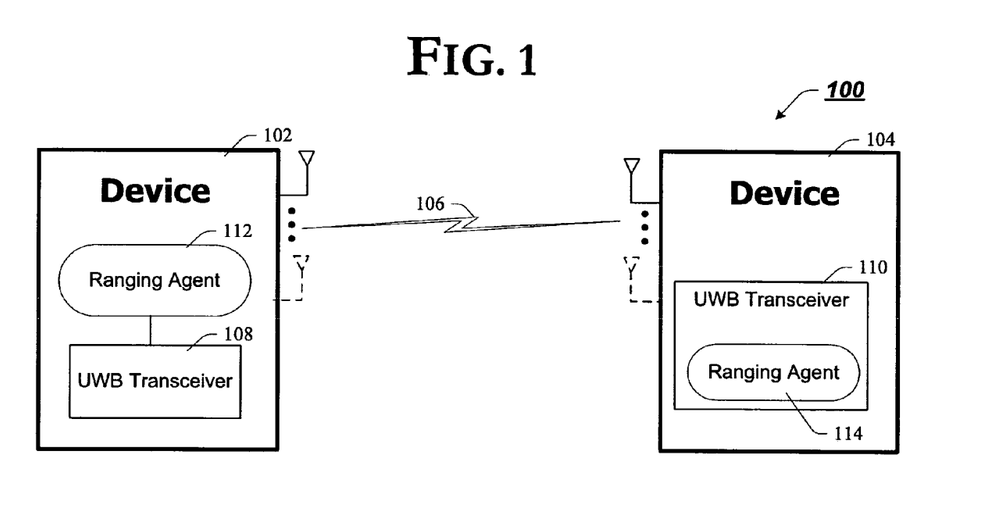
FIG. 1 is a block diagram of an example wireless communication environment incorporating the teachings of the present invention, according to but one example embodiment.

FIG. 1 illustrates a block diagram of a wireless communication environment (e.g., an UWB communication environment) within which the teachings of the present invention may be practiced. In accordance with the illustrated example embodiment of FIG. 1, two or more electronic devices 102 and 104 are selectively coupled through an ultrawideband (UWB) wireless communication channel 106. To facilitate such communication, electronic devices 102, 104 are depicted comprising an ultrawideband (UWB) transceiver 108, 110 with an associated one or more antenna(e) through which the transmission/reception of UWB signal(s) of communication channel 106 is effected.

In accordance with the teachings of the present invention, one or both of devices 102, 104 may utilize a ranging agent 112, 114, which may determine the proximal distance between the devices. As developed more fully below, ranging agent 112, 114 initiates an exchange of messages between the devices 102,104 (or, ranging agents therein), wherein the devices log a strobe time of transmission/ reception of such messages. The strobe times are selectively exchanged, and one or more of ranging agent 112, 114 computes one or more of the signal propagation time ($t_p$)

(i.e., distance/signal velocity), timing offset ($t_o$), and frequency offset ($f_o$) of the reference clocks between the devices. Given at least one or more of the signal propagation time, timing offset, and frequency offset, a ranging agent (e.g., 112) determines a proximal distance, or range, between its associated UWB transceiver (e.g., 108) and responding remote transceiver(s) (e.g., 110). For the determination of frequency offset, two (2) or more measurement pairs may be required.

In accordance with the illustrated example embodiment, different device implementations 102, 104 depict the ranging agent as coupled with (112) or integrated within (114) a UWB transceiver (108, 110, respectively), although the invention is not limited in this regard. That is, alternate implementations are envisioned wherein a remote ranging agent is communicatively coupled to one or more remote UWB transceivers to implement the teachings of the present invention to determine the proximal distance between one or more devices engaged in UWB communication. Thus, numerous alternate embodiments of the ranging agent, and its implementation within the communication environment are envisioned within the scope and spirit of the present invention.

As used herein, electronic devices 102, 104 are intended to represent any of a broad range of electronic appliances, computing appliances, communication appliances, and the like. Moreover, in accordance with one example implementation, devices 102, 104 may well represent one or more electronic components of (or, within) such appliances, such as, for example, chipsets, communication bridges, microprocessors, baseband processors, radio-frequency integrated circuits (RFICs), and the like to facilitate ultrawideband communication of content (audio, video, data, etc.) between such components within the appliances. It should be appreciated, based on the description to follow, that embodiments of the invention may well be implemented in hardware, software, firmware and/or any combination thereof within the scope and spirit of the present invention.

In this regard, the communication environment depicted 100 is intended to represent any of a broad range of communication environments. So, too, is the communication channel 106 intended to represent any of a wide variety of communication channels. According to one example implementation, communication channel 106 is established by transceivers 108, 110 to comply with the pulsed-RF UWB channel characteristics described in the FCC approval for unlicensed UWB use introduced above, although the invention is not so limited.

As introduced above and described more fully below, each ranging agent 112, 114 may work with an associated UWB transceiver 108, 110 to exchange messages (e.g., ranging messages) between devices 102, 104, from which a proximal distance between the devices can be determined. As described below, ranging agent 112, 114 effectively computes one or more of the signal propagation (or, delay) time ($t_p$), the difference in local clocks, or timing offset ($t_o$) and frequency offsets ($f_o$) to calculate an increasingly accurate estimate of the proximal distance between devices 102, 104. Those skilled in the art will appreciate that the determination of the proximal distance may well be useful in support of a myriad of applications such as, for example, security/authentication applications, transmission control applications, effecting location-based services, and the like.

Example Ranging Agent Architecture

Figure 2:
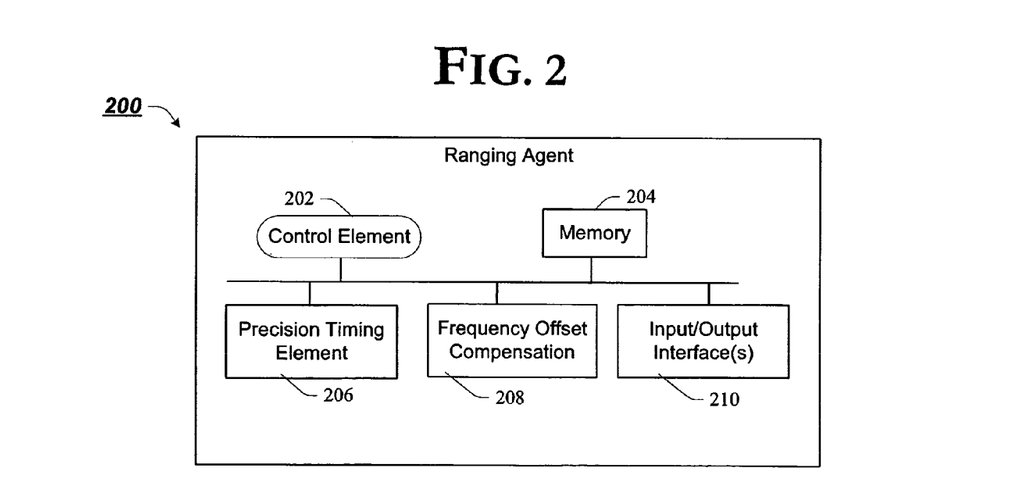
FIG. 2 is a block diagram of an example ranging agent, according to one example embodiment.

FIG. 2 is a block diagram of an example ranging agent, according to one example embodiment of the invention. In accordance with the illustrated example implementation of FIG. 2, ranging agent 200 is depicted comprising one or more of control element(s) 202, memory 204, a precision timing engine 206, frequency offset compensation element 208, and input/output communication interface(s) 210 although the invention is not limited in this regard. According to one example embodiment, ranging agent 200 may well be implemented within environment 100 as one or more of ranging agent 112 and/or 114.

It will be appreciated, given the discussion to follow, that although depicted as a number of disparate elements, one or more elements of ranging agent 200 may well be combined into multifunctional elements (e.g., precision timing engine 206 and frequency offset compensation 208). Alternatively, one or more elements of ranging agent 200 may well represent elements physically located external to, yet utilized by, ranging agent 200, e.g., one or more elements of precision timing engine 206 may well be located within an associated UWB transceiver. In this regard, ranging agents of greater or lesser complexity are anticipated within the scope and spirit of the present invention.

In accordance with the illustrated example embodiment, control element 202 controls the overall operation of ranging agent 202, although the invention is not so limited. In this regard, control element 202 selectively invokes one or more elements 204–210 of ranging agent 200 to determine the proximal distance between an associated transceiver and one or more remote transceiver(s). To perform the precision ranging measurements described herein, control element 202 may communicate with and/or control at least an associated UWB transceiver through I/O communication interface(s) 210. As used herein control element 202 is intended to represent any of a broad range of control elements including, but not limited to, one or more microprocessors, microcontrollers, field-programmable gate arrays (FPGA), application specific integrated circuits (ASIC), special purpose controllers, executable content (e.g., software or firmware) to implement such control functions, or any combination thereof.

As used herein, memory 204 is intended to represent any of a wide variety of storage media/mechanisms known in the art. In accordance with the illustrated embodiment, memory 204 may be used by ranging agent 200 to store ranging information computed for one or more remote device(s).

Precision timing engine 206 may be selectively invoked by, e.g., control element 202, to determine one or more of signal propagation time ($t_p$), and timing offset ($t_o$). According to one example embodiment, precision timing engine 206 generates and records strobe times from the transmission and/or reception of an analog representation of ranging messages (i.e., at radio frequency (RF) or baseband). Control element 202 may then compare such recorded times with transmission/reception strobe times exchanged with the one or more remote transceivers to compute such signal propagation and offset times.

Figure 3:
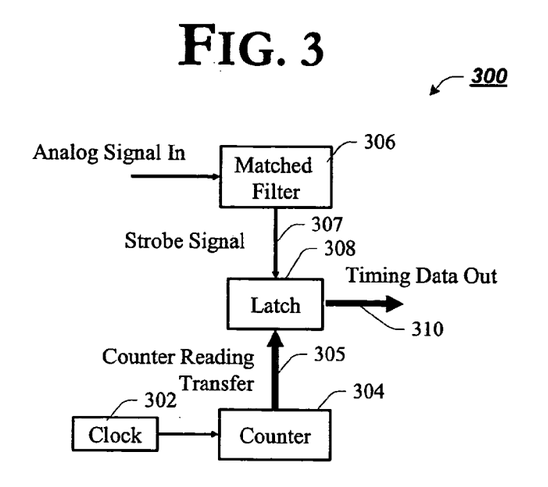
FIG. 3 is a block diagram of a precision timing engine, according to one example embodiment of the invention.

Turning to FIG. 3, a block diagram of an example of at least a subset of a precision timing engine architecture is presented, in accordance with but an example embodiment of the invention. In accordance with the illustrated example implementation, precision timing engine 300 is depicted comprising one or more of a clock 402, a counter 404, a matched filter and a latch 408, each coupled as depicted to providing timing data (410) upon the transmission or receipt of, e.g., ranging messages.

In accordance with the illustrated example implementation, clock 302 provides a reference signal (305) to counter 304, the output of which is provided to latch element 308. At the beginning of a ranging measurement, precision timing engine 206 initializes the counter 306. In certain implementations, the clock elements of the devices in UWB communication (e.g., clock 302 within precision timing engine 206) may be (a) frequency locked via communication messages (e.g., preamble calibration routines), or (b) are accurate enough that any frequency offset between the clocks in either device is negligible over the short period of the ranging measurement. Use of the frequency offset compensation element 208 of ranging agent 200, may even eliminate the need for assumption (b), as the frequency offset may be computed. As described more fully below, the clock elements are used to record the strobe times associated with transmission/reception of two or more messages (e.g., dedicated ranging messages) between the devices, from which signal propagation and offset times are computed, as detailed more fully below.

As shown, an analog representation (at radio frequency (RF) or baseband, e.g., from an associated UWB transceiver) of the ranging message is provided to a matched filter 306. Once the level of the received analog signal exceeds some threshold (set at the filter), a strobe signal is generated, which may cause the latch 308 to parallel transfer the contents of the counter 304 as the timing data 310 associated with, or representative of the strobe time. According to one example implementation, this timing data 310 is recorded e.g., in memory 204, for subsequent use in determining the ranging information.

According to one embodiment, the strobe should be generated with minimal associated delays that could introduce variation in the time measurement. For this reason, a mechanism (e.g., the matched filter) that operates directly in response to the analog signal, or equivalent, is employed, although other mechanisms may well be used. In one embodiment, the process of exchanging messages between the devices may be repeated a number (N) of times and averaged to reduce the effect of any zero-mean random errors.

For sub-nanosecond precision, the clock should preferably be operating at 1 GHz or greater, and the counter should preferably have enough stages to cover the expected turnaround time (U):

$$U \sim (T'_A - T_A) \sim (T'_B - T_B) \quad (1)$$

where: $T_A$ is the recorded time of transmission of message M at a first device (A)

$T_B$ is the recorded time of reception of message M at a second device (B)

$T'_B$ is the recorded time of transmission of message M' at device B $T'_A$ is the recorded time of reception of message M' at device A.

Thus, a 4 GHz clock and 24-stage counter/latch could cover turnaround time intervals of large as four milliseconds (4 ms).

Although depicted as a number of disparate elements, those skilled in the art will appreciate that one or more of such elements may well be combined into a common element. Moreover, it should be appreciated that one or more elements of the precision timing architecture 300 may well be reside external to the ranging agent, e.g., within the UWB transceiver and/or host device. In this regard, precision timing engine architectures of greater or lesser complexity that nonetheless generate a strobe upon the receipt of an analog signal, as described below, are anticipated within the scope and spirit of the present invention.

Returning to FIG. 2, it was noted above that the accuracy of the calculated signal propagation time ($t_p$) diminishes as the turnaround time (U) increases due to clock frequency offset between the two transceivers. As used herein, frequency offset compensation 208 is selectively invoked by, e.g., control element 202 to identify and compensate for a frequency offset between the clocks used in recording transmission/reception strobe times. More particularly, frequency offset compensation element 208 calculates the ratio of the clock frequency of one device (e.g., 102) with respect to another device (e.g., 104) through the exchange of a number of messages (e.g., five messages) denoting transmit and receive strobe times. An example of just such a method is presented below, with reference to FIG. 7.

As denoted above, to determine the proximal distance between two devices, ranging agent 200 may interface with an UWB transceiver to facilitate the exchange of messages. According to one example implementation, the messages are dedicated "ranging" messages. In other instances, ranging agent 200 may record the transmit/receive strobe times associated with normal (i.e., non-dedicated) UWB transceiver communication. In either case, ranging agent 200 is communicatively coupled to one or more elements a host device (e.g., 102) and/or an associated UWB transceiver (e.g., 108) through input/output (I/O) interface(s) 210. Such communication may be completed in accordance with any of a broad range of standard or proprietary, wired or wireless communication protocols. In this regard, I/O interface(s) 210 is intended to represent any of a broad range of such wired or wireless interface(s) known in the art and, as such, need not be described further.

Example Operation

Ranging Measurement

Figure 4:
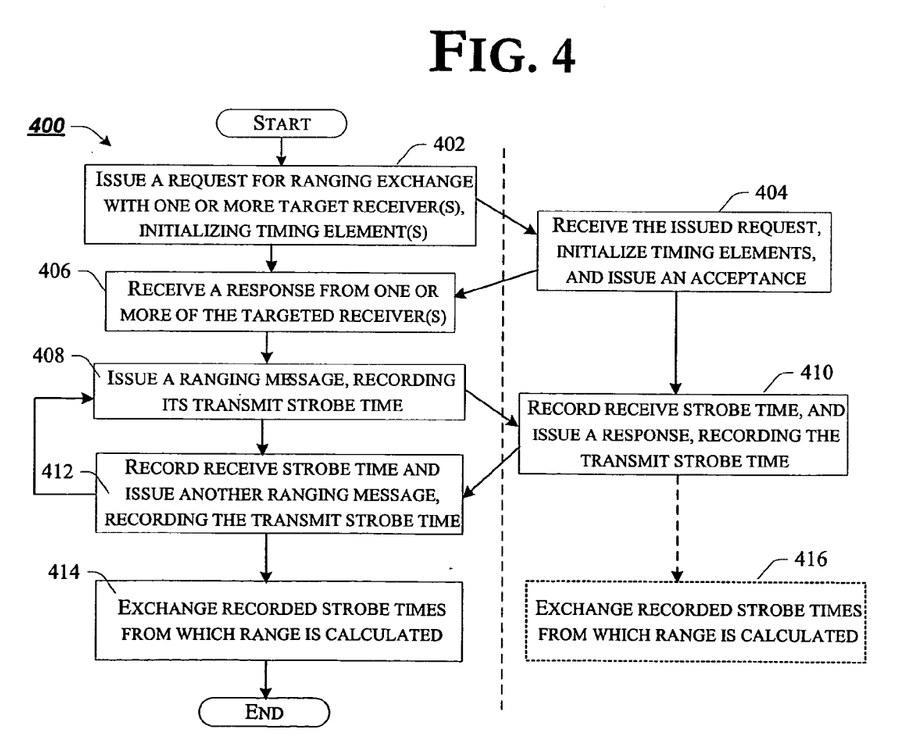
FIG. 4 is a flow chart of an example method for providing precision ranging measurements within a wireless communication system, according to one example embodiment of the invention.

Having introduced an example embodiment of the architecture and operating environment of the ranging agent 200, above, attention is now directed to FIG. 4, where a flow chart of an example method for performing precision ranging measurements in an UWB communication environment is presented, in accordance with but one example embodiment of the invention. For ease of illustration, and not limitation, the method of FIG. 4 is developed with continued reference to FIGS. 1 through 3, as appropriate. Nonetheless, it is to be appreciated that the teachings of FIG. 4 may well be implemented in alternate architectures/environments without deviating from the spirit and scope of the present invention.

FIG. 4 is a flow chart of an example method for precision ranging measurements in an UWB communication environment, according to one example embodiment of the invention. In accordance with the illustrated example embodiment of FIG. 4, the method begins with block 402, wherein an initiating ranging agent (e.g., 112 associated with device 102) is invoked to determine the proximal distance between an associated UWB transceiver (e.g., 108) and one or more remote target transceiver(s) (e.g., 110). More particularly, control element 202 invokes an instance of precision timing engine 206, which initializes the appropriate timing/counter elements (304) and issues a request for ranging exchange with one or more target receiver(s) (110) through UWB transceiver (108).

In block 404 (at the remote device 104), the transceiver (110) receives the issued request, and ranging agent initializes one or more timing elements (e.g., counter 304), and issues an acceptance to the initiating device (102).

Upon receipt of the acceptance via UWB transceiver (108), block 406, ranging agent 112 generates and issues a ranging message, recording the transmit strobe time, block 408. More particularly, as described in FIG. 3, an analog representation of the ranging message is received at matched filter 306. Once the analog representation reaches a threshold, the filter 306 generates a strobe signal 307, which causes latch 308 to parallel transfer the current output of counter 304 as the transmit strobe time ($T_A$).

In block 410, the remote device (104) receives the ranging message and records the time of receipt. In the illustrated example embodiment of, e.g., FIG. 1, a precision timing engine 206 of the remote ranging agent (114) receives an analog representation of the received message at a matched filter 306. Once the analog representation of the received message reaches a threshold, the matched filter 306 generates a strobe signal 307, which causes latch 308 to parallel transfer the current output of counter 304 as the receive strobe time ($T_B$).

Once the time of receipt ($T_B$) is recorded, remote ranging agent (114) generates a ranging message for transmission through an associated UWB transceiver (110) to device 102, block 410. As above, an analog representation of the ranging message is received at a matched filter 306 of ranging agent 114 such that once the analog representation of the ranging message reaches a threshold, a transmit strobe 307 is generated by the matched filter 306, which may cause the latch 308 to parallel transfer the current output of counter 304 as the time of transmit ($T'_B$).

In block 412, ranging agent 112 of device 102 receives the ranging message from the remote device (104) and records the receive strobe time ($T'_A$), using the elements of precision timing engine 300 described above. This process of exchanging ranging messages (blocks 408–412) may be performed a number (N) of times to reduce the impact of any zero-mean timing error in the process.

In blocks 414 and 416, respectively, the ranging agents 112, 114 of the devices 102, 104 exchange the recorded transmit and receive strobe times, from which signal propagation delay ($t_p$) and timing offset ($t_o$) may be calculated. According to one example embodiment, control element 202 in a respective ranging agent (112, 114) calculates the propagation delay ($t_p$) as:

$$t_p = \frac{(T'_A - T_A) - (T'_B - T_B)}{2} = \frac{distance}{signal\_velocity} \quad (2)$$

where: $T_A$ is the recorded time of transmit of message M at a first device (A);

$T_B$ is the recorded time of reception of message M at a second device (B):

$$T_B = T_A + t_o + t_p \quad (3)$$

$T'_B$ is the recorded time of transmit of message M' at a second device (B);

$T'_A$ is the recorded time of reception of message M' at the first device (A):

$$T'_A = T'_B - t_o + t_p \quad (4)$$

Figure 5:
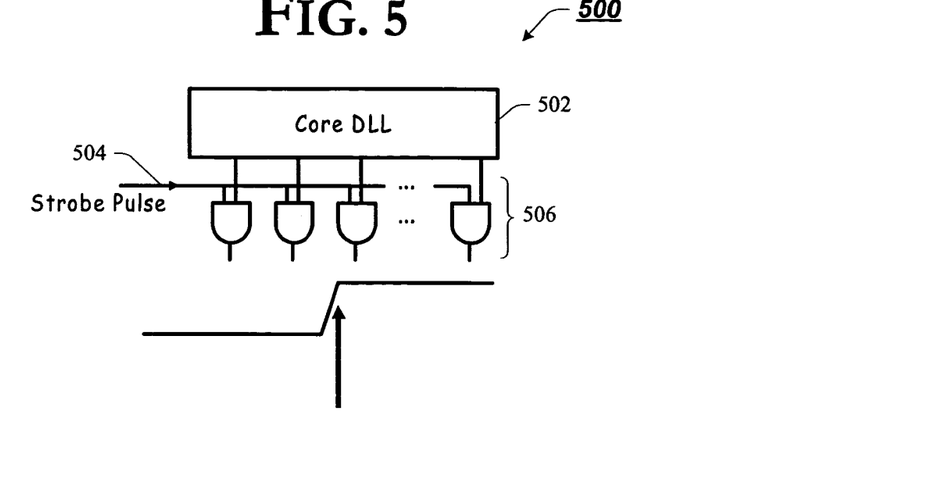
FIG. 5 is a block diagram of a delay locked loop (DLL) suitable for use as a counter within the precision timing element, according to one example embodiment of the invention.

FIG. 5 is a block diagram of an example counter implementation, suitable for use in (or, by) the example precision timing engine 206, according to one example embodiment of the invention. In accordance with the illustrated example embodiment of FIG. 5, counter element 500 is depicted comprising a core delay locked loop (DLL) 502, coupled with a number of AND-gates 506. In addition to the output of DLL 502, another input of the AND-gates 506 are coupled to receive a strobe pulse 504. In certain embodiments, the strobe pulse 504 may be the strobe pulse 307 as described in accordance with FIG. 3.

The implementation of FIG. 5 recognizes that some implementations of an UWB transceiver (e.g., 108, 110) may comprise a delay locked loop (DLL) for high-frequency clock generation, timing and phase adjustment. In this regard, the DLL 502 of FIG. 5 may well reside in an associated UWB transceiver. Regardless, a composite timing measurement may be derived by a frame counter, as described above, plus a derived delay based on the arrival of a generated strobe pulse (e.g., 307) in relation to the phasing in the DLL pulses (see, e.g., FIG. 5). It is noted that exchanging counter 304 (with it's multiple stages) with a series of AND-gates may save power and implementation space.

Figure 6:
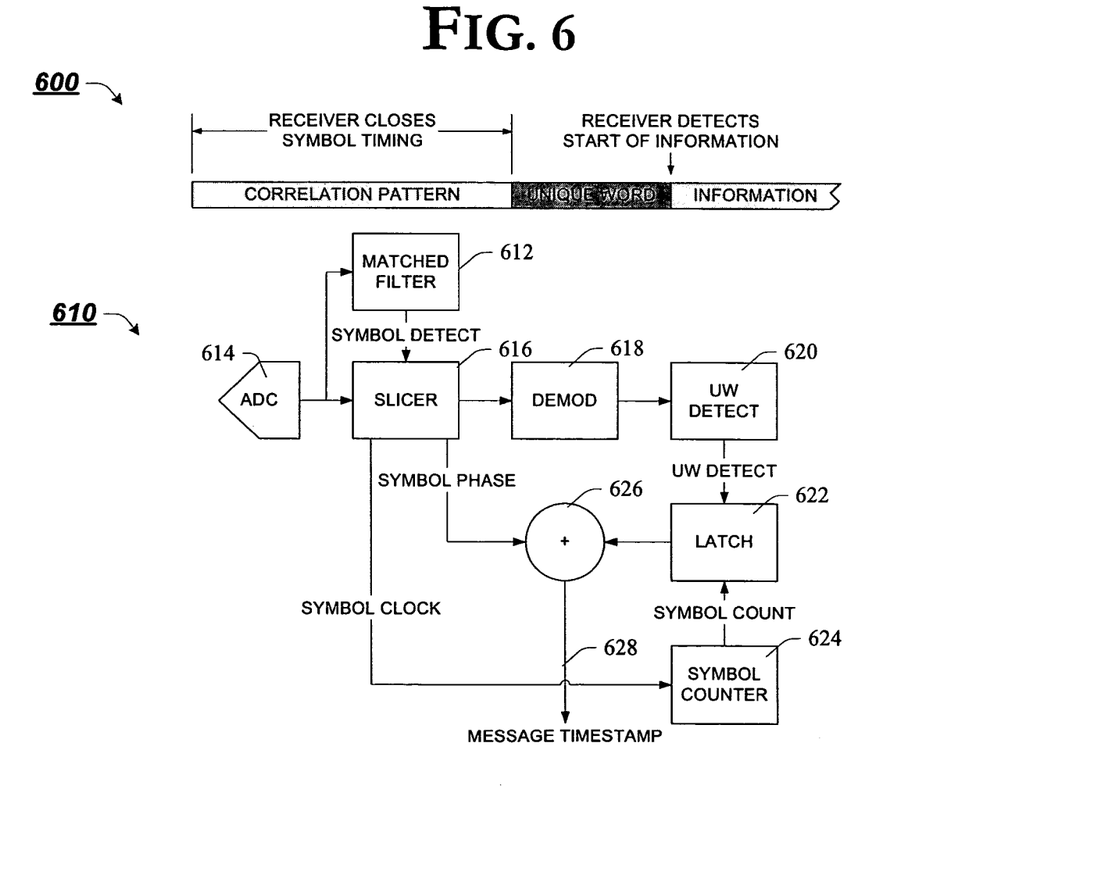
FIG. 6 is block diagram of precision timing element using elements of an ultrawideband transceiver and message time stamps, according to one example embodiment of the invention.

FIG. 6 is a block diagram of an example counter implementation, suitable for use in (or, by) the example precision timing engine 206, according to but one example embodiment of the invention. In accordance with the illustrated example embodiment of FIG. 6, precision timing element 610 is depicted comprising a matched filter 612, an analog to digital converter 614, a slicer 616, demodulator 618, ultrawideband detector 620, a latch 622, a symbol counter 624 and a summing element 626, each coupled as depicted. It will be appreciated that although depicted as a number of disparate elements, one or more of such elements 612–626 may well be combined. As such, precision timing elements of greater or lesser complexity are anticipated within the spirit and scope of the present invention.

In accordance with the illustrated example embodiment of FIG. 6, a message time stamp of high precision for a received message (e.g., 600) can be constructed from the combination of a symbol rate counter (624) plus (626) the receiver phase offset. As shown, the phase offset may be obtained from, e.g., a numerically controlled oscillator (NCO) located in the slicer 616 that is clocked at the symbol rate.

Clock Frequency Offset Compensation

As previously mentioned, the accuracy of the calculated propagation delay ($t_p$) diminishes as the turnaround time increases due to clock frequency offset between the two radios. However, the clock frequency offset between the two radios can be calculated after a few (e.g., 5) message exchanges as provided in FIG. 7. In this regard, FIG. 7 is a communication flow diagram of an example method for determining frequency offset between the UWB transceivers to provide an improved level of ranging accuracy, according to yet another aspect of an embodiment of the invention.

According to one example embodiment, the communication flow diagram described herein is implemented by ranging agent 200, within communication environment 100 and, as such, reference to such elements is made for purposes of illustration, and not limitation. As described in detail above, upon the transmission/reception of a message (e.g., M1–M5 denoted herein), a ranging agent in each of the devices A and B (e.g., 102 and 104) record a strobe time associated with such transmission or reception. According to one example embodiment, the method for generating the strobe(s) is analogous to the one detailed above, although the invention is not limited in this regard.

Figure 7:
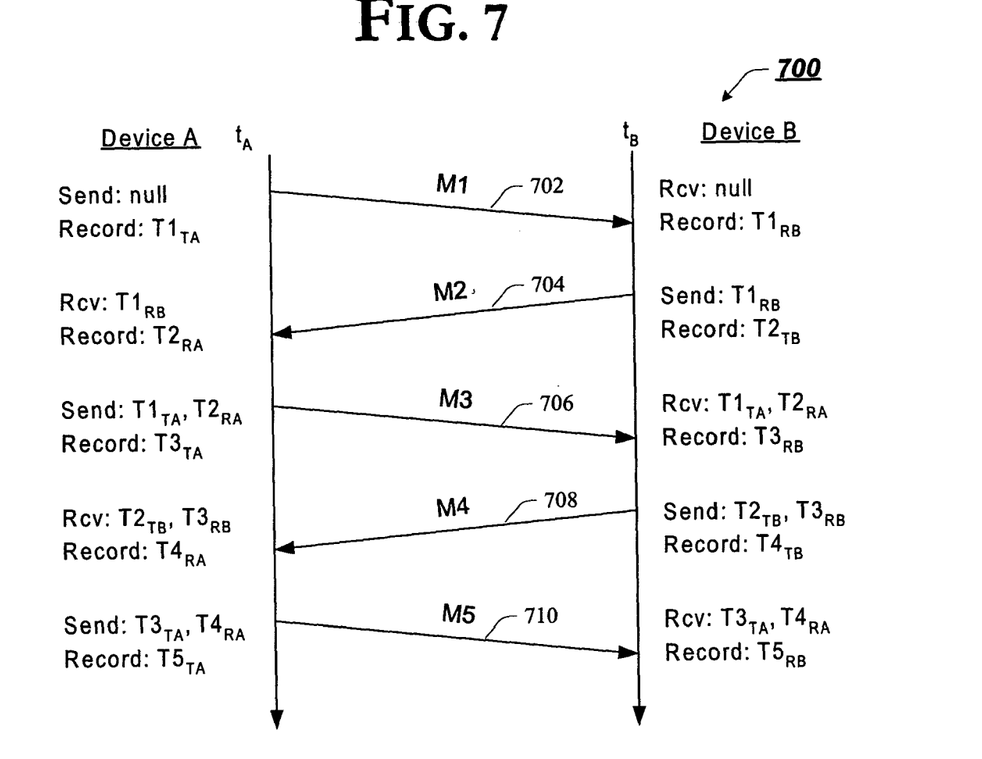
FIG. 7 is communication flow diagram for a method for clock frequency offset compensation, according to one example embodiment of the invention.

Thus, the method of FIG. 7 begins with reference 702 wherein device A (e.g., 102) issues a message M1 (e.g., a null message), recording the time of its transmission $T1_{TA}$, consistent with the teachings above.

Upon receipt of message M1, a remote device B (e.g., 104) records the time of reception $T1_{RB}$, in accordance with the teachings above. Remote device B (104) then issues message M2 at 704 including as a payload the time of reception $T1_{RB}$. Remote device B (104) records the time of transmission of message M2 as $T2_{TB}$.

Upon receipt of message M2, device A (e.g., 102) records the time of reception $T2_{RA}$, in accordance with the teachings above, as well as the content of the payload. Device A (102) then issues message M3 at 706 including as a payload the time of transmission of message 1 ($T1_{TA}$), as well as the time of reception of message M2, i.e., $T2_{RA}$. Device A (102) records the time of transmission of message M3 as $T3_{TA}$.

Upon receipt of message M3, remote device B (104) records the time of reception $T3_{RB}$, in accordance with the teachings above, as well as the message payload. Device B (104) then issues message M4 at 708 including as a payload the time of transmission of message 2 $T2_{TB}$ as well as the time of reception of message 3, $T3_{RB}$. Remote device B (104) records the time of transmission of message M4 as $T4_{TB}$.

Upon receipt of message M4, device A (e.g., 102) records the time of reception $T4_{RA}$, in accordance with the teachings above, as well as the content of the payload. Device A (102) then issues message M5 at 710 including as a payload the time of transmission of message 3 ($T3_{TA}$), as well as the time of reception of message M4, i.e., $T4_{RA}$. Device A (102) records the time of transmission of message M5 as $T5_{TA}$.

Upon receipt of message M5, remote device B (104) records the time of reception $T5_{RB}$, in accordance with the teachings above, as well as the message payload.

Upon completion of the foregoing message exchange, the frequency offset compensation element 208 calculates the ratio of the clock frequency (302) of Device A (e.g., 102) with respect to Device B (e.g., 104) in accordance with equation (5), below:

$$f_o = \frac{T1_{TA} - T3_{TA}}{T1_{RB} - T3_{RB}} \Rightarrow f_o T1_{RB} - f_o T3_{RB} = T1_{TA} - T3_{TA} \quad (5)$$

where: $f_o$ is the frequency offset identified between the two devices, $T(N)_{TA}$: is the recorded time of transmit of message (N:1 ... 3) from device (A), $T(N)_{TB}$: is the recorded time of transmit of message (N:1 ... 3) from device (B), $T(N)_{RA}$: is the recorded time of receive of message (N:1 ... 3) from device (A), and $T(N)_{TB}$: is the recorded time of receive of message (N:1 ... 3) from device (B).

That is, device A has the information necessary to calculate the frequency offset ($f_o$) after receiving message M4, while device has the information necessary after receipt of message M5. As a result, both devices A and B (e.g., 102 and 104) can independently calculate the propagation delay ($t_p$) regardless of clock frequency offset, in accordance with equation (6), below:

$$f_o T1_{RB} = T1_{TA} + t_o + t_p \quad (6)$$

$$T2_{RA} = f_o T2_{TB} - t_o + t_p$$

-continued $$f_o T1_{RB} + T2_{RA} = T1_{TA} + f_o T2_{TB} + 2t_p \Rightarrow t_p$$
$$= \frac{f_o T1_{RB} + T2_{RA} - T1_{TA} - f_o T2_{TB}}{2}$$

Alternate Embodiment(s)

Figure 8:
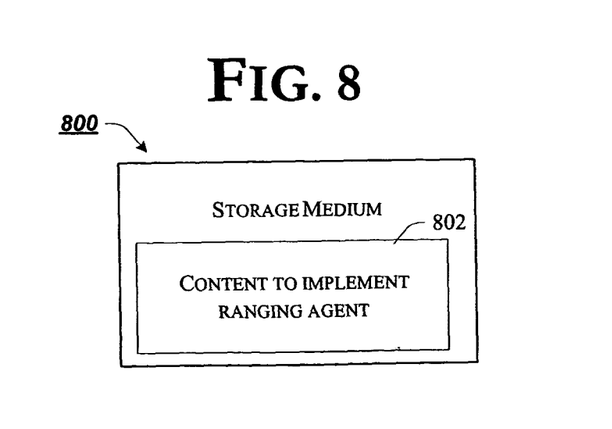
FIG. 8 is a block diagram of an example article of manufacture including content which, when executed by an accessing machine, causes the machine to implement one or more aspects of embodiment(s) of the invention.

FIG. 8 illustrates a block diagram of an example storage medium comprising content which, when invoked, may cause a device accessing such content to implement one or more aspects of the ranging agent 200 and/or associated methods 300, 700. In this regard, storage medium 800 includes content 802 (e.g., instructions, data, or any combination thereof) which, when executed, causes an accessing device to implement one or more aspects of ranging agent 200, described above.

The machine-readable (storage) medium 800 may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem, radio or network connection).

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the present invention may be used in a variety of applications. Although the present invention is not limited in this respect, the circuits disclosed herein may be used in microcontrollers, general-purpose microprocessors, Digital Signal Processors (DSPs), Reduced Instruction-Set Computing (RISC), Complex Instruction-Set Computing (CISC), among other electronic components. However, it should be understood that the scope of the present invention is not limited to these examples.

Embodiments of the present invention may also be included in integrated circuit blocks referred to as core memory, cache memory, or other types of memory that store electronic instructions to be executed by the microprocessor or store data that may be used in arithmetic operations. In general, an embodiment using multistage domino logic in accordance with the claimed subject matter may provide a benefit to microprocessors, and in particular, may be incorporated into an address decoder for a memory device. Note that the embodiments may be integrated into radio systems or hand-held portable devices, especially when devices depend on reduced power consumption. Thus, laptop computers, cellular radiotelephone communication systems, two-way radio communication systems, one-way pagers, two-way pagers, personal communication systems (PCS), personal digital assistants (PDA's), cameras and other products are intended to be included within the scope of the present invention.

The present invention includes various operations. The operations of the present invention may be performed by hardware components, such as those shown in FIGS. 1 and/or 2, or may be embodied in machine-executable content (e.g., instructions) 802, which may be used to cause a general-purpose or special-purpose processor or logic circuits programmed with the instructions to perform the operations. Alternatively, the operations may be performed by a combination of hardware and software. Moreover, although the invention has been described in the context of a computing appliance, those skilled in the art will appreciate that such functionality may well be embodied in any of number of alternate embodiments such as, for example, integrated within a communication appliance (e.g., a cellular telephone).

Many of the methods are described in their most basic form but operations can be added to or deleted from any of the methods and information can be added or subtracted from any of the described messages without departing from the basic scope of the present invention. Any number of variations of the inventive concept are anticipated within the scope and spirit of the present invention. For example, although the description above describes the use of dedicated ranging messages, ranging agent 200 may well adopt a paradigm of recording and exchanging the time of transmission/reception of all "standard" communication traffic, i.e., that associated with the normal operation of the UWB transceiver in it operating environment from which to calculate one or more of a propagation delay $t_p$, offset time $t_o$ and/or frequency offset $f_o$. Moreover, although the exchange of ranging messages are presented as being in-band, alternate embodiments wherein such messages are exchanged out-of-band, or through a dedicated control channel may well be used.

In this regard, the particular illustrated example embodiments are not provided to limit the invention but merely to illustrate it. Thus, the scope of the present invention is not to be determined by the specific examples provided above but only by the plain language of the

What is claimed is:

1. A method comprising:
   exchanging two or more ultrawideband (UWB) signals with one or more target device(s), each device recording a transmission strobe time and a receive strobe time associated with the transmission and reception of such signal(s);
   exchanging the recorded transmission strobe time(s) and receive strobe time(s) associated with the exchanged UWB signals from which one or more of a signal propagation time, timing offset and frequency offset are computed; and
   computing as a frequency offset between two devices a ratio of the clock frequency of the first device with respect to the second device using the transmission and receive strobe times associated with the exchange of a number (N) of ranging messages, in accordance with the followings equation:

$$f_o = \frac{T1_{TA} - T3_{TA}}{T1_{RB} - T3_{RB}} \Rightarrow f_o T1_{RB} - f_o T3_{RB} = T1_{TA} - T3_{TA}$$

where: $TN_{TA}$ is the recorded time of transmit of message N (1 . . . 3) at a first device (A);
   $TN_{RB}$ is the recorded time of reception of message N at a second device (B); and $f_o$ is the frequency offset.

2. A method according to claim 1, further comprising:
   computing as the signal propagation time and the timing offset the time delay between the transmission strobe time of an issuing device, and the receive strobe time at the target device.

3. A method according to claim 2, wherein the signal propagation time is computed after the exchange of at least two messages, M and M', in accordance with the following equation:

$$t_p = \frac{(T'_A - T_A) - (T'_B - T_B)}{2} = \frac{distance}{signal\_velocity}$$

where: $T_A$ is the recorded time of transmit of message M at a first device (A);
   $T_B$ is the recorded time of reception of message M at a second device (B):
   $T'_B$ is the recorded time of transmit of message M' at a second device (B); and
   $T'_A$ is the recorded time of reception of message M' at the first device (A).

4. A method according to claim 3, wherein the time of reception ($T_B$, or $T'_A$) represents the time of transmission, signal propagation delay, and a timing offset between the device(s) ($t_o$).

5. A method according to claim 1, wherein the number N is four (4).

6. A method according to claim 1, wherein the signal propagation time is computed after the exchange of at least four (4) messages in accordance with the following equation:

$$t_p = \frac{f_o T1_{RB} + T2_{RA} - T1_{TA} - f_o T2_{TB}}{2}$$

where: $f_o$ is the frequency offset identified between the two devices,
   $T(N)_{TA}$: is the recorded time of transmit of message (N:1 . . . 3) from device (A),
   $T(N)_{TB}$: is the recorded time of transmit of message (N:1 . . . 3) from device (B),
   $T(N)_{RA}$: is the recorded time of receive of message (N:1 . . . 3) from device (A), and
   $T(N)_{TB}$: is the recorded time of receive of message (N:1 . . . 3) from device (B).

7. A storage medium comprising content which, when implemented by an accessing device, causes the device to implement a method of claim 6.

8. A method according to claim 1, further comprising:
   detecting a transmission strobe time, or a reception strobe time by receiving an analog representation of the message for transmission or upon reception, respectively, and denoting a time when the analog representation of the message exceeds a threshold level.

9. An apparatus comprising:
   an ultrawideband (UWB) transceiver to transmit and/or receive ultrawideband wireless signals;
   a ranging agent, coupled with the UWB transceiver, to exchange two or more ultrawideband (UWB) signals with one or more target device(s), each device recording a transmission strobe time and a receive strobe time associated with the transmission and reception of such signal(s), and to exchange the recorded transmission strobe time(s) and receive strobe time(s) associated with the exchanged UWB signals from which one or more of a signal propagation time, timing offset and frequency offset are computed; and a frequency offset compensation element, responsive to a control element, to receive transmission and reception strobe times associated with the exchange of a number (N) of messages, and to determine a frequency offset as a ratio of a ratio of the clock frequency of the first device with respect to the second device.

10. An apparatus according to claim 9, the ranging agent comprising:

a precision timing engine, responsive to a control element, to generate and issue multiple (N) messages via the UWB transceiver, to record the transmission and reception strobe time(s) associated with the exchange of such messages, and to compute one or more of the signal propagation time and the timing offset from which the proximal distance is determined.

11. An apparatus according to claim 10, the precision timing engine comprising:

a filter, to receive an analog representation of a message and generate a strobe signal once the analog representation of the message reaches a threshold; and a latch element, coupled with the filter, to transfer an output of a counter to the control element to record the counter output as a strobe time associated with the transmission or reception of the message.

12. An apparatus according to claim 9, wherein the frequency offset compensation element determines the frequency offset between the two devices in accordance with the following equation:

$$f_o = \frac{T1_{TA} - T3_{TA}}{T1_{RB} - T3_{RB}} \Rightarrow f_o T1_{RB} - f_o T3_{RB} = T1_{TA} - T3_{TA}$$

where: $TN_{TA}$ is the recorded time of transmit of message N (1 . . . 3) at a first device (A);

$TN_{RB}$ is the recorded time of reception of message N at a second device (B); and $f_o$ is the frequency offset.

13. An apparatus according to claim 12, wherein the number N of messages exchanged between the devices to ensure that both devices have a complete set of transmission and reception strobe times for both devices is four (4).

14. An apparatus according to claim 12, wherein the control element determines the propagation delay after the exchange of at least four (4) messages in accordance with the following equation:

$$t_p = \frac{f_o T1_{RB} + T2_{RA} - T1_{TA} - f_o T2_{TB}}{2}$$

where: $f_o$ is the frequency offset identified between the two devices, $T(N)_{TA}$: is the recorded time of transmit of message (N:1 . . . 3) from device (A), $T(N)_{TB}$: is the recorded time of transmit of message (N:1 . . . 3) from device (B), $T(N)_{RA}$: is the recorded time of receive of message (N:1 . . . 3) from device (A), and $T(N)_{TB}$: is the recorded time of receive of message (N:1 . . . 3) from device (B).

15. An apparatus according to claim 9, further comprising:

control logic, coupled with a memory element comprising executable content, to execute at least a subset of the content to implement the ranging agent.

16. A system comprising:

one or more antenna(e);

a wireless transceiver, coupled with the anntena(e), to transmit/receive wireless signals in support of communication between the system and a remote system; and a ranging agent, coupled with the wireless transceiver, to exchange two or more wireless signals with one or more target device(s), each device recording a transmission strobe time and a receive strobe time associated with the transmission and reception of such signal(s), and to exchange the recorded transmission strobe time(s) and receive strobe time(s) associated with the exchanged wireless signals from which one or more of a signal propagation time, timing offset and frequency offset are computed; and a frequency offset compensation element, responsive to a control element, to receive transmission and reception strobe times associated with the exchange of a number (N) of messages, and to determine a frequency offset as a ratio of a ratio of the clock frequency of the first device with respect to the second device.

17. An system according to claim 16, the ranging agent comprising:

a precision timing engine, responsive to a control element, to generate and issue multiple (N) messages via the wireless transceiver, to record the transmission and reception strobe time(s) associated with the exchange of such messages, and to compute one or more of the signal propagation time and the timing offset from which the proximal distance is determined.

* * * * *